United States Patent
Debois et al.

(10) Patent No.: US 9,021,521 B2
(45) Date of Patent: *Apr. 28, 2015

(54) SYSTEM AND METHOD FOR DELIVERING ADVERTISING CONTENT ACCORDING TO A SELECTION RECEIVED FROM SUBSCRIBER EQUIPMENT

(71) Applicant: AT&T Intellectual Property I, LP, Atlanta, GA (US)

(72) Inventors: Dean Debois, Acworth, GA (US); Frank Coppa, Kansas City, MO (US); James D. Huffman, Garden Grove, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,516

(22) Filed: Sep. 3, 2013

(65) Prior Publication Data

US 2014/0007160 A1    Jan. 2, 2014

Related U.S. Application Data

(63) Continuation of application No. 12/828,232, filed on Jun. 30, 2010, now Pat. No. 8,555,314.

(51) Int. Cl.
*H04N 7/10* (2006.01)
*H04N 7/025* (2006.01)
(Continued)

(52) U.S. Cl.
CPC ....... *H04N 21/812* (2013.01); *H04N 21/23424* (2013.01); *H04N 21/6408* (2013.01); *H04N 21/64322* (2013.01); *H04N 21/26225* (2013.01);
(Continued)

(58) Field of Classification Search
CPC .......... H04N 21/812; H04N 21/23424; H04N 21/44016; H04N 21/6408; H04N 21/64322; H04N 21/26225; H04N 21/4722; H04N 21/23614; H04N 21/2365; H04N 21/2543; H04N 21/2547; H04N 21/2665; H04N 21/4312; H04N 21/482; G06Q 30/0241; H04H 60/375
USPC .......... 725/4, 32, 36, 42, 60; 705/14.4, 14.49, 705/14.55, 14.67; 370/535
See application file for complete search history.

(56) References Cited

U.S. PATENT DOCUMENTS 5,734,853 A    3/1998    Hendricks et al.
6,014,184 A    1/2000    Knee
(Continued)

*Primary Examiner* — Hoang-Vu A Nguyen-Ba
(74) *Attorney, Agent, or Firm* — Guntin & Gust, PLC; Jay H. Anderson

(57) ABSTRACT

A system that incorporates teachings of the present disclosure may include, for example, a server comprising a memory to store executable instructions and a controller coupled to the memory. The controller, reponsive to executing the instructions, performs operations comprising presenting a graphical user interface enabling selectable advertisements or a selectable channel distribution service for delivery to a set top box, presenting filters for targeted delivery of advertisements to subscriber equipment based on information descriptive of the subscriber, selecting advertisements from an advertising server based on detected selections of advertisements or a detected channel distribution service preference, transmitting a globally unique identifier of the set top box to a billing server, initiating storage of the selectable advertisements at a remote advertisement delivery server, and presenting the selectable advertisements to the set top box. Other embodiments are disclosed.

20 Claims, 6 Drawing Sheets

(51) Int. Cl.

| | | |
|---|---|---|
| *G06F 3/00* | (2006.01) | |
| *H04N 5/445* | (2011.01) | |
| *G06Q 30/00* | (2012.01) | |
| *H04N 21/81* | (2011.01) | |
| *H04N 21/234* | (2011.01) | |
| *H04N 21/6408* | (2011.01) | |
| *H04N 21/262* | (2011.01) | |
| *H04N 21/4722* | (2011.01) | |
| *H04N 21/236* | (2011.01) | |
| *H04N 21/2365* | (2011.01) | |
| *H04N 21/2543* | (2011.01) | |
| *H04N 21/2665* | (2011.01) | |
| *H04N 21/431* | (2011.01) | |
| *H04N 21/441* | (2011.01) | |
| *H04N 21/482* | (2011.01) | |
| *G06Q 30/02* | (2012.01) | |
| *H04H 60/37* | (2008.01) | |
| *H04N 21/258* | (2011.01) | |
| *H04N 21/44* | (2011.01) | |
| *H04N 21/658* | (2011.01) | |
| *H04N 7/16* | (2011.01) | |
| *H04J 3/04* | (2006.01) | |
| *H04N 21/643* | (2011.01) | |
| *H04N 21/2547* | (2011.01) | |

(52) U.S. Cl.
CPC ..... *H04N 21/4722* (2013.01); *H04N 21/23614* (2013.01); *H04N 21/2365* (2013.01); *H04N 21/2543* (2013.01); *H04N 21/2547* (2013.01); *H04N 21/2665* (2013.01); *H04N 21/4312* (2013.01); *H04N 21/441* (2013.01); *H04N 21/482* (2013.01); *G06Q 30/0241* (2013.01); *H04H 60/375* (2013.01); *H04N 21/25891* (2013.01); *H04N 21/44016* (2013.01); *H04N 21/6582* (2013.01)

(56) References Cited

U.S. PATENT DOCUMENTS

| | | | |
|---|---|---|---|
| 6,828,993 | B1 | 12/2004 | Hendricks et al. |
| 6,978,470 | B2 | 12/2005 | Swix |
| 7,243,362 | B2 | 7/2007 | Swix et al. |
| 2001/0007097 | A1 | 7/2001 | Kim |
| 2003/0067554 | A1* | 4/2003 | Klarfeld et al. ............... 348/461 |
| 2005/0097599 | A1* | 5/2005 | Plotnick et al. ................. 725/32 |
| 2005/0289623 | A1 | 12/2005 | Midani et al. |
| 2008/0016525 | A1 | 1/2008 | Cai et al. |
| 2008/0046915 | A1 | 2/2008 | Haeuser et al. |
| 2008/0295128 | A1* | 11/2008 | Aaltonen ........................ 725/32 |
| 2010/0238924 | A1 | 9/2010 | Liu |
| 2011/0126250 | A1 | 5/2011 | Turner |

* cited by examiner

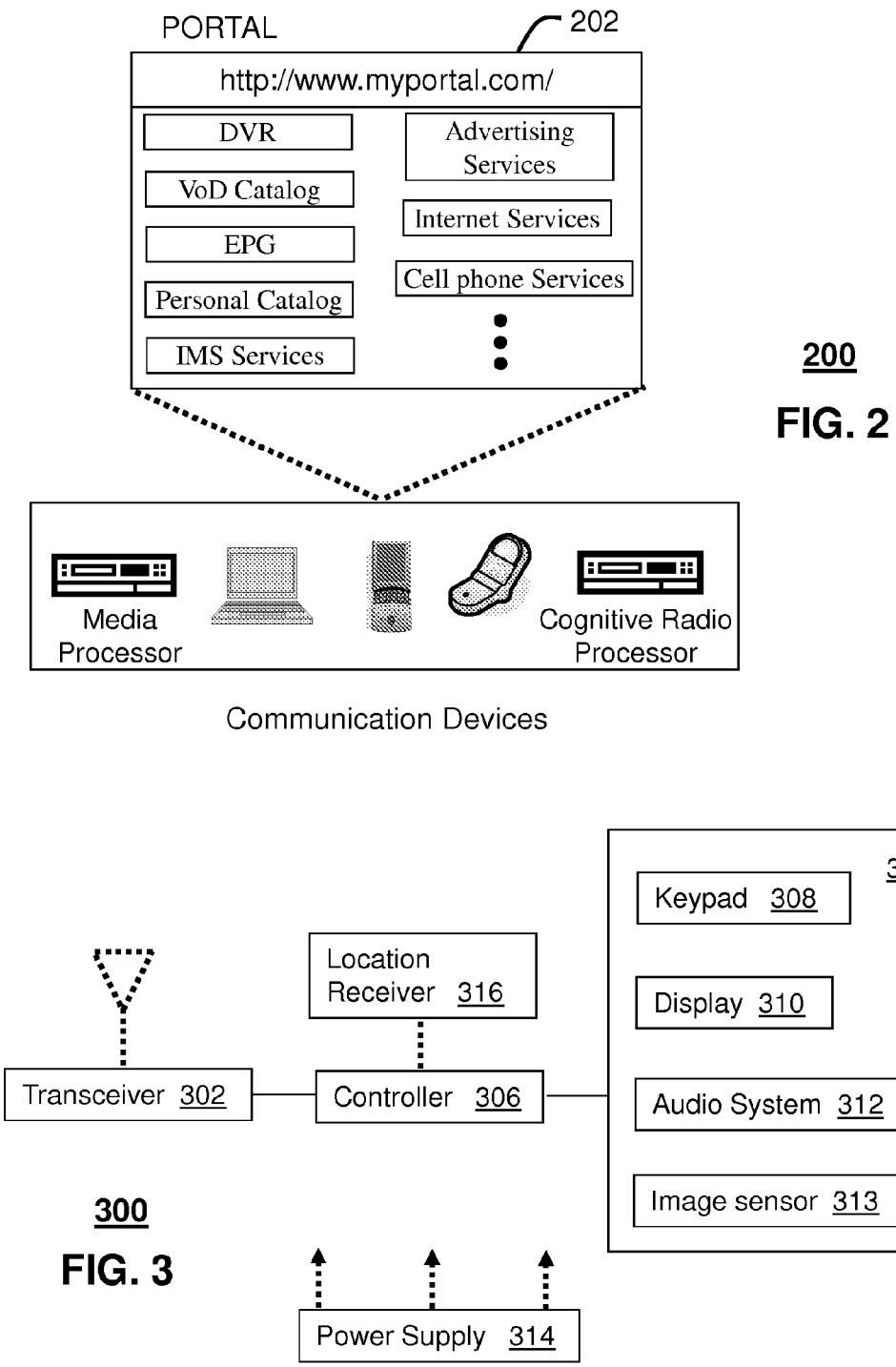

600

SYSTEM AND METHOD FOR DELIVERING ADVERTISING CONTENT ACCORDING TO A SELECTION RECEIVED FROM SUBSCRIBER EQUIPMENT

CROSS-REFERENCE TO RELATED APPLICATIONS

This application is a continuation of U.S. patent application Ser. No. 12/828,232 filed Jun. 30, 2010 which is incorporated herein by reference in its entirety.

FIELD OF THE DISCLOSURE

The present disclosure relates generally to communication systems and more specifically to a system and method of ad delivery.

BACKGROUND

Interactive TV networks provide a multitude of services including broadcast programming and video-on-demand. These networks reach out to users in various environments including single family residences, multi-dwelling apartments and commercial facilities. The types of service and the ability to provide those services are often dependent on the particular environment of the potential users. Quite often, the subscribers to these networks have limited choices in selecting the individual ads and channels selections they can receive. Instead, ads are delivered without any targeting and any selection of channels is based on packages of a preset and defined set of channels that are distributed to the subscriber.

The Internet enables the individual selection and distribution of video content through website like YouTube and Hulu.com, but video distribution networks do not seem to provide similar flexibility in terms of channel distribution selection or ad selection by a subscriber. Ads are generally fed as part of a overall video feed or inserted as part of local programming by a local programming service.

BRIEF DESCRIPTION OF THE DRAWINGS

FIG. 2 depicts an illustrative embodiment of a portal interacting with the communication system of FIG. 1;

FIG. 3 depicts an illustrative embodiment of a communication device utilized in the communication system of FIG. 1;

DETAILED DESCRIPTION

One embodiment of the present disclosure can entail a server comprising a memory to store executable instructions and a controller coupled to the memory. The controller, reponsive to executing the instructions, performs operations comprising presenting a graphical user interface enabling selectable advertisements and channel distribution service preferences for delivery to a set top box, presenting filters for targeted delivery of advertisements based on information descriptive of a subscriber, selecting advertisements from an advertising server based on detected selections of advertisements or detected service preferences from the graphical user interface, transmitting a globally unique identifier of the set top box to a billing server, initiating storage of the selectable advertisements at a remote advertisement delivery server, and presenting the selectable advertisements.

Another embodiment of the present disclosure can entail a server comprising a memory to store executable instructions and a controller coupled to the memory, wherein responsive to executing the instructions, the controller performs operations comprising logging selections, received from subscriber equipment at an internet protocol television network, of advertisement preferences from an advertising server or of channel service preferences from a channel service server; storing billing information regarding the subscriber; forwarding information regarding the selections by the subscriber equipment to a subscriber management system of the internet protocol television network; and receiving a globally unique identifier for a set top box.

Yet another embodiment of the present disclosure can entail a method comprising receiving, at a server comprising a processor, a selection by subscriber equipment of advertising content from an advertising server or video channel content from a channel service server, wherein the selection is enabled using a graphical user interface presented via a set top box having a globally unique identifier; storing, by the server, the selection on a delivery server using the globally unique identifier of the set top box; and inserting, by the server, the selected advertising content into a video stream for presentation by the subscriber equipment, the video stream comprising broadcasted content, wherein the selected advertising content is incorporated into the video stream in response to a signal in the broadcasted content that an advertisement is to be inserted.

Figure 1:
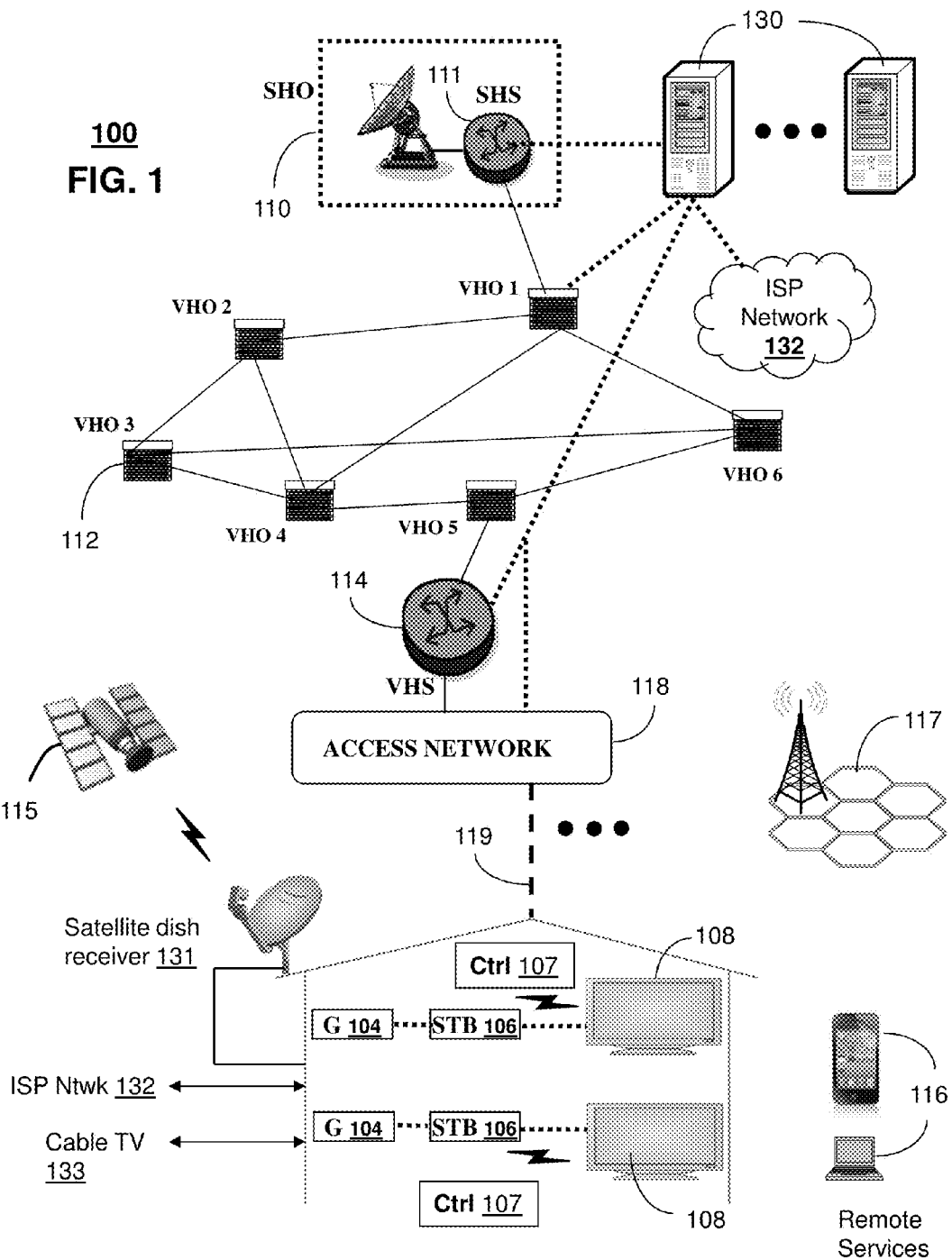
FIG. 1 depicts an illustrative embodiment a of communication system that provides program retrieval services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The building 102 can be various types including multi-dwelling units which house a plurality of different subscribers. The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of relaying and/or receiving media content to ISP network 132 or to other networks. One or more of the computing devices 130 can also serve herein as an application server, a channel service catalog service (server), an ad storage server, an ad delivery server, an IPTV billing system server among other server applications.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services, provisioning Internet services, provisioning cellular phone services, provisioning services such as security services or advertising services and so on. For example, a user can utilize the portal to configure the cognitive radio processor for receiving video security footage as it is captured by security cameras in the building. In another embodiment, the captured video can be forwarded to other communication devices and/or entities, such as a mobile telephone of the user or the police. In yet another embodiment, the services can enable the insertion of targeted advertising as set up by the subscriber or other entity.

FIG. 3 depicts an exemplary embodiment of a communication device 300. Communication device 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1.times., UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player.

Figure 4:
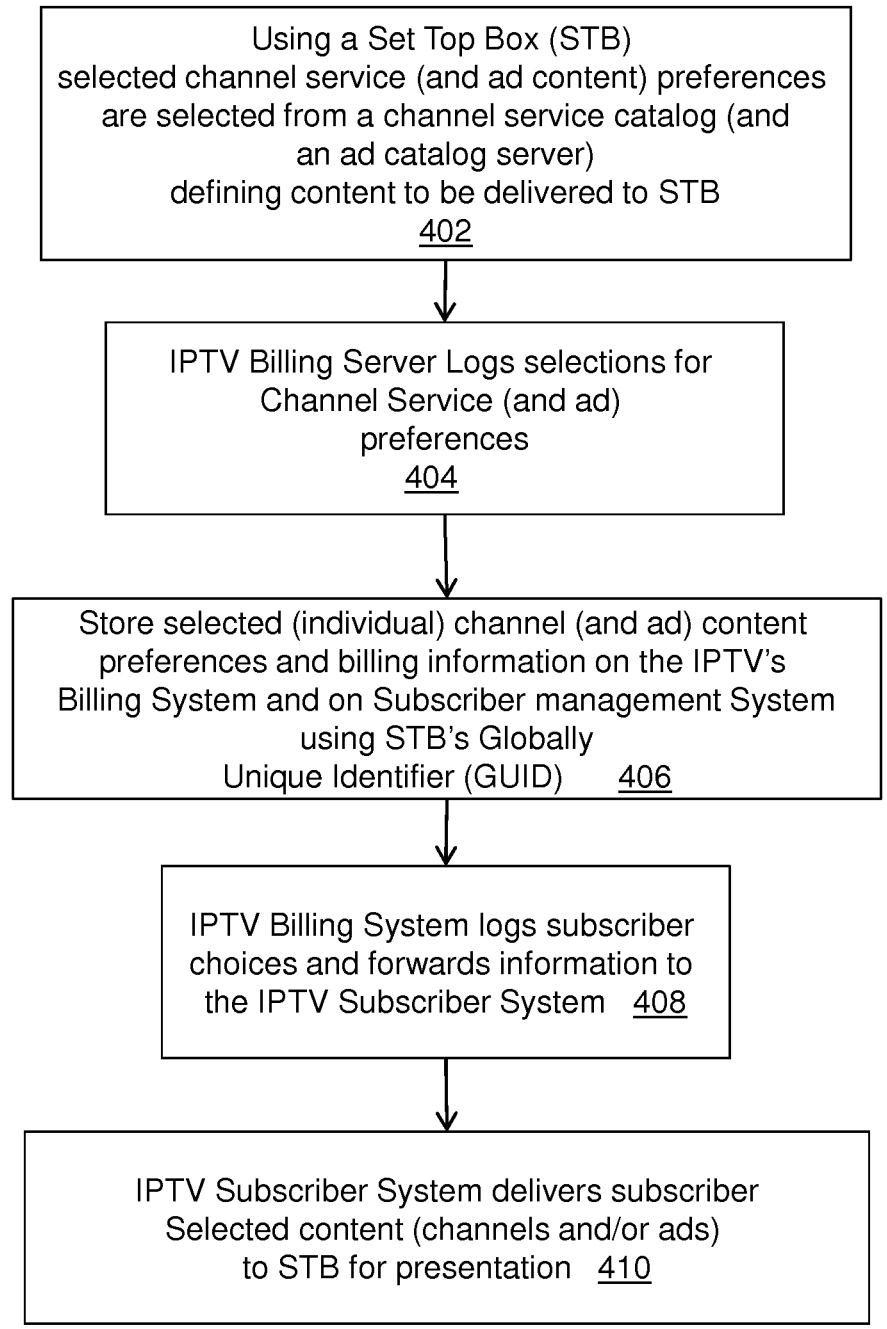
FIG. 4 depicts an illustrative embodiment of a communication system flow diagram utilized in the communication system of FIG. 1.
Figure 5:
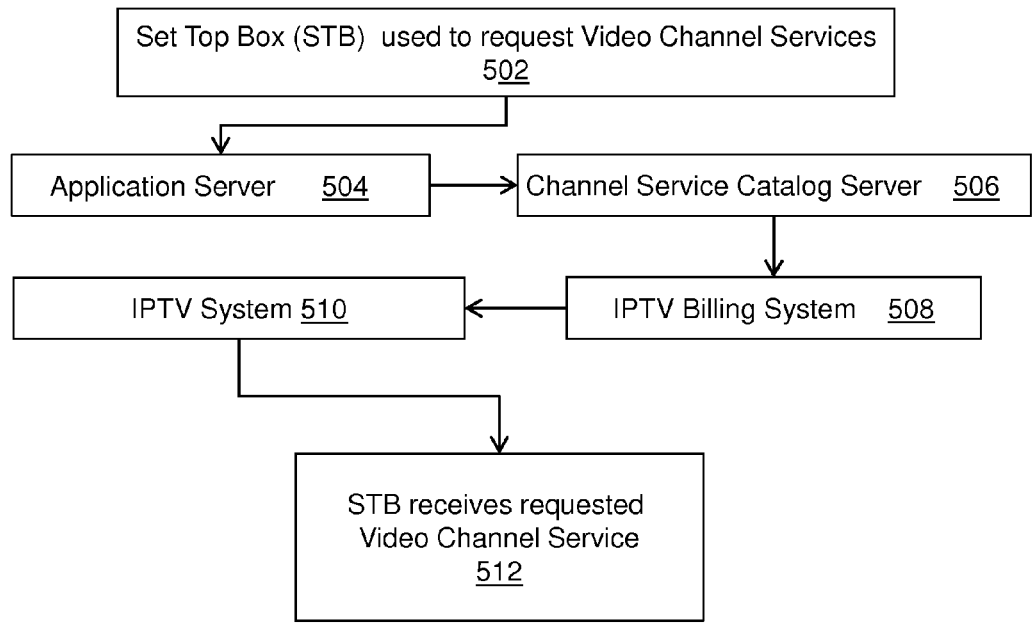
FIG. 5 depicts yet another illustrative embodiment of a communication system flow diagram in the communication system of FIG. 1.

FIGS. 4 and 5 depict illustrative embodiments of a system or flow 400 and another system or flow 500 for enabling a subscriber to select and receive subscriber selectable channels and optionally advertising that is also subscriber selectable. In this regard, a subscriber can select preferences for channels or ads or even actual individual channels or ad content that can be streamed to the user. The ads can be streamed to the user in a targeted fashion in a digital television system such as an IPTV system. The systems 400 or 500 can provide la carte IPTV Advertising that enable system subscribers to choose advertisements that fit their interests from a Set top Box (STB) as well as la carte IPTV channel selection. The viewer or subscriber can select specific advertising content via a Graphical User Interface (GUI) which will in turn store their choices on an Ad Delivery Server. The Ad Delivery Server can then present the subscriber's preferred advertising content during a next available ad break as further detailed below. In a similar fashion, a subscriber can use a GUI to select channels for subsequent channel distribution to an STB.

Referring again to FIG. 4, the system or flow 400 in one embodiment can enable a subscriber to select individual channels from a channel service catalog (server) and optionally ad content from a catalog server using a STB at 402. An IPTV billing server can optionally log the subscriber channel service selection (and ad content selection) at 404. The system can use broadcaster queue tone information to determine a location or time (or time slot) for delivery of the ad to a particular subscriber or STB. In one particular embodiment, an Ad Campaign Manager can deliver the subscriber selected ad content (or content in accordance with a selected subscriber preference) to the STB via a unicast transmission. At 406, the system can store selected individual channels or sets of channels (and optionally ad content) or preferences for such channels and ads as well as billing information on an IPTV billing system and an IPTV subscriber management system. Such storage of information can include an STB's Global Unique Identifier (GUID). At 408, the IPTV billing system can log subscriber choices and forward information to an IPTV subscriber (delivery) system. The IPTV subscriber system can then deliver the selected content to the STB for presentation at 410.

Such a system can resolve several issues that allegedly disturb advertisers and subscribers. Advertisers would obviously want to discourage channel flipping away from the specific broadcasted content and subscribers are more likely to stay on a particular channel if they had the ability to insert advertisement into the Setup Top Box that pique the specific subscriber's interests. For example as a 40 year old male consumer would not necessarily want to receive product information or services that are only designed for females or receive product information for specific age groups when it is not applicable to them. In this regard, advertising that is not related to the viewer or subscriber's interest may not be as effective as subscriber selected advertising. The consumer will be able to select content from a GUI that is specific to content that personally interests them. For example, sports, sporting events, local events, medical, personal care, environment, travel, automobiles, racing, gaming, fashion or any other particular interest. Other techniques or inputs can be used in addition to the subscriber selectable preference to further refine the particular ads that can be delivered to the subscriber. Other inputs can include, but are not limited to demographics, geographic location, purchase histories and the like.

Similarly, with respect to channel selections, a subscriber can select channels that interest them and thereby discourage channel flipping away from the specific broadcasted content. Subscribers are more likely to stay on a particular channel if they had the ability to select and receive channels that generally piques the specific subscriber's interests. These techniques bring e-commerce to a next level by allowing consumers to be more interactive when selecting video service and purchasing products and services through such a system.

In yet another embodiment, a system or flow 500 can enable a subscriber to request video channel services via an STB at 502 from a channel service catalog server 506 via an application server 504. As discussed in the example above an IPTV billing server at 508 can optionally log the subscriber channel selection and forward the subscriber selection information to an IPTV Subscriber system 510. The IPTV subscriber system sends the requested video channels or channel service (in accordance with a selected subscriber preference or selection) to the STB at 512.

From an STB, a subscriber can be presented with a screen or GUI that allows them to choose specific channel choices and advertising content from respective catalogs that can reside at remote servers. Once the subscriber has selected the advertisement content (whether channels or ads or both) that piques his or her interests, this information will then be stored on respective delivery servers using for example the STB's GUID (Globally Unique Identifier). Note that the ad content can be on one server and the video channel content can be on another. Optionally, both the ad content and video channel content can be on the same server. In any event, when the broadcasted content calls for an advertisement to be inserted, the specific advertisement content that the subscriber specified can be spliced into the viewed video stream. If the subscriber does not select any content, then default ad insertion policies can be applied. The other service providers simply broadcast advertising content during specific time slots to all viewers.

Figure 6:
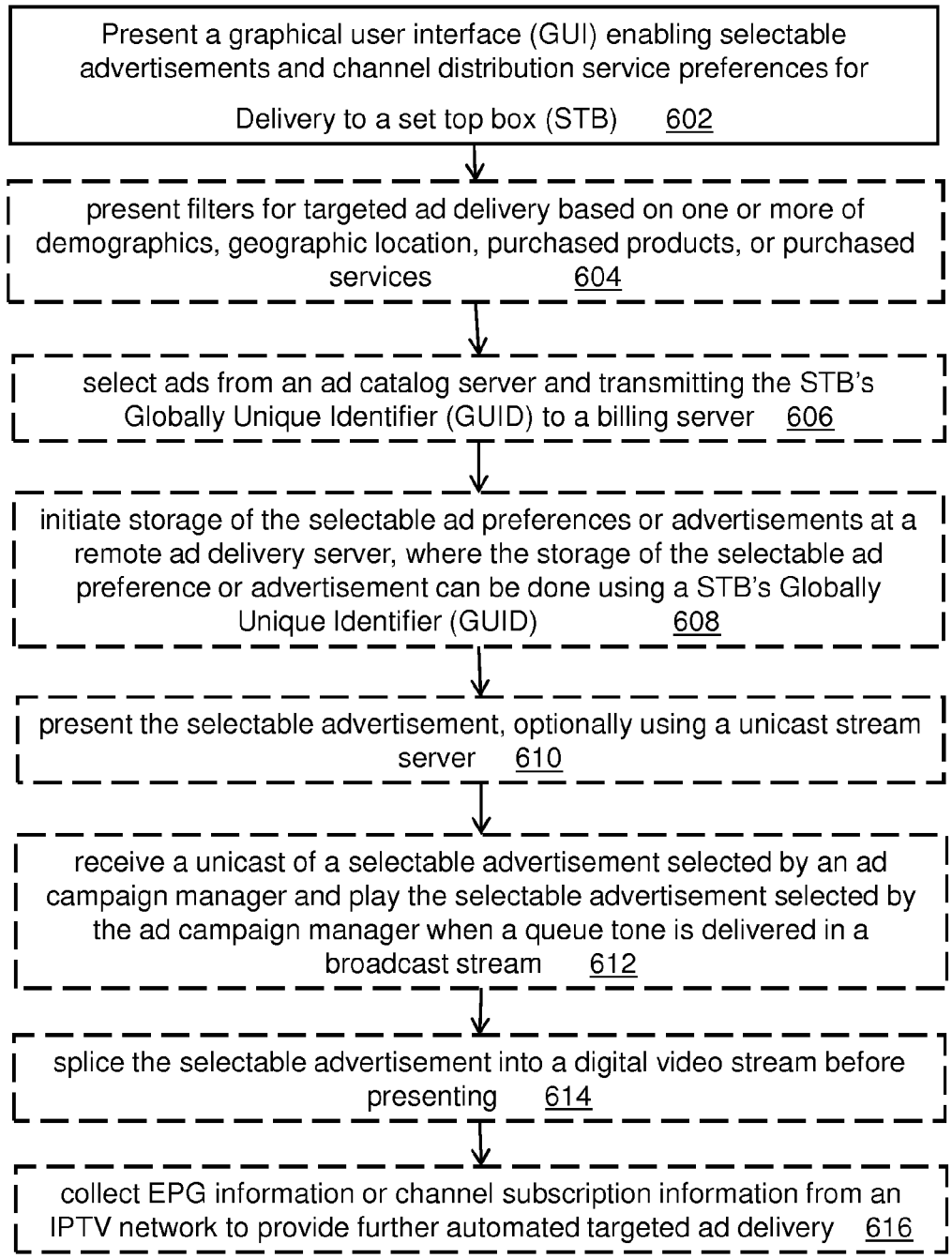
FIG. 6 depicts an illustrative embodiment of a method operating in portions of the communications systems of FIG. 1.

FIG. 6 depicts an illustrative method 600 that operates in portions of the communication systems of FIG. 1. Method 600 can begin with step 602 in which the method at 602 presents a graphical user interface (GUI) enabling subscriber selectable advertisements and channel distribution service for delivery to a set top box (STB). At 604, the method 600 can present filters for targeted ad delivery based on one or more of demographics, geographic location, purchased products, or purchased services. At 606, the system can select ads from an ad catalog server (based on subscriber selected preferences or subscriber selections) and transmit the STB's Globally Unique Identifier (GUID) to a billing server. At 608, such selection can initiate storage of the subscriber selectable advertisements at a remote ad delivery server, where the storage of the subscriber selectable advertisement can be done using a STB's GUID. Note that the selection can also optionally or alternatively initiate storage of selectable ads or other content at the STB in other embodiments. At 610, the method can present the subscriber selectable advertisement, optionally using a unicast stream server. In one embodiment, the method at 612 can receive a unicast transmission of a subscriber selectable advertisement selected by an ad campaign manager and play the subscriber selectable advertisement selected by the ad campaign manager when a queue tone is delivered in a broadcast stream. Transmission of the ad can involve splicing the subscriber selectable ad at 614 into a digital video stream before the presentation (610). In yet another option, the method at 616 can collect EPG information or channel subscription information from an IPTV network to provide further automated targeted ad delivery. It should be understood that the order or inclusion of the steps should not be implied from the specific order described and illustrated herein.

Upon reviewing the aforementioned embodiments, it would be evident to an artisan with ordinary skill in the art that said embodiments can be modified, reduced, or enhanced without departing from the scope and spirit of the claims described below. For example, such a system and method can entail in a particular embodiment an STB or server which can ultimately insert ads in a similar fashion as discussed above where the IPTV system is further coupled to a wireless network and remote devices as illustrated in FIG. 1. Such remote devices can also be treated as an STB in the context of the embodiments herein.

Other suitable modifications can be applied to the present disclosure without departing from the scope of the claims below. Accordingly, the reader is directed to the claims section for a fuller understanding of the breadth and scope of the present disclosure.

Figure 7:
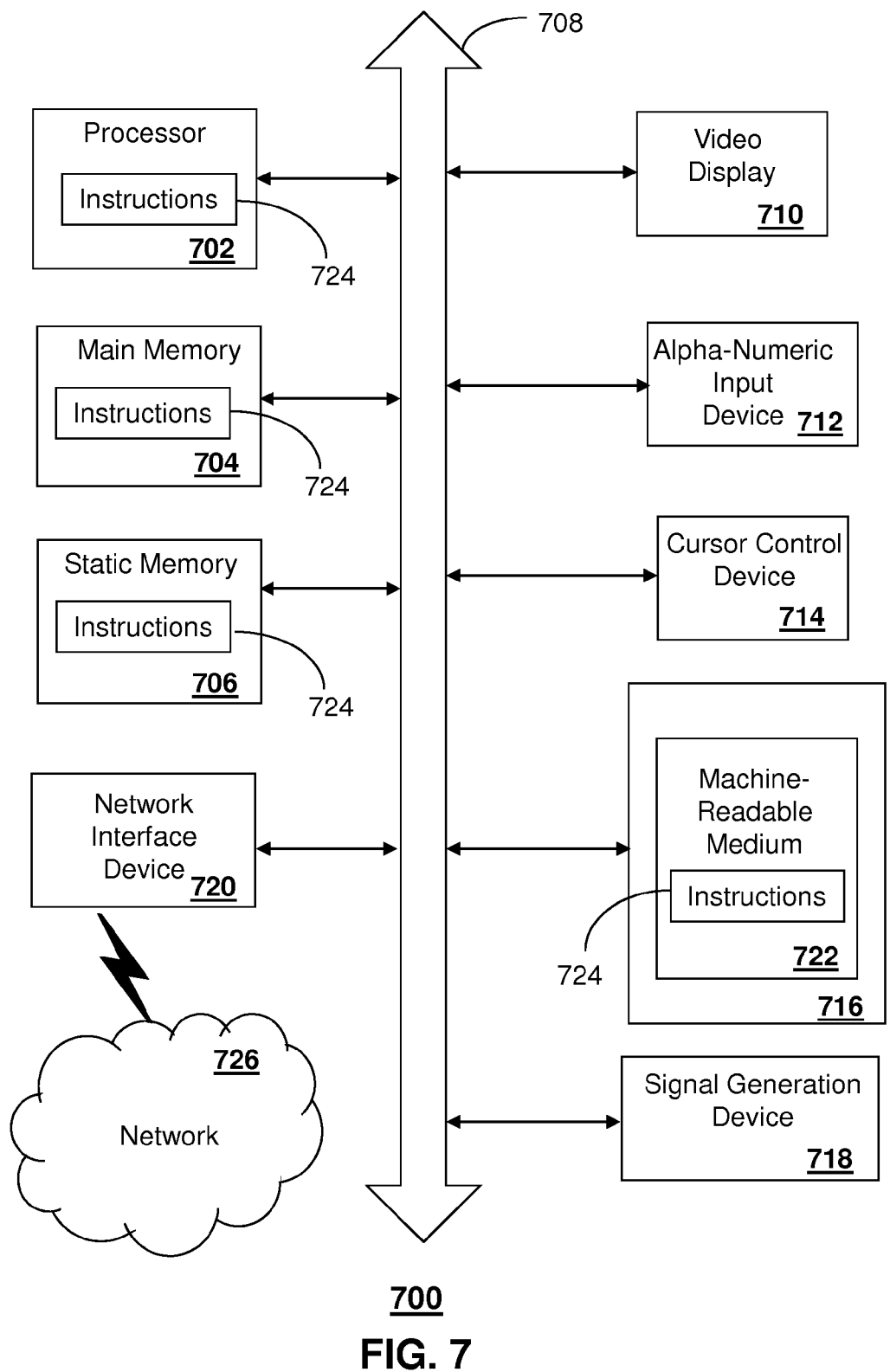
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. .sctn.1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server comprising:
a memory to store executable instructions; and
a controller coupled to the memory, wherein responsive to executing the instructions, the controller performs operations comprising:
presenting a graphical user interface enabling selectable advertisements or a selectable channel distribution service for delivery to a set top box;
presenting filters for targeted delivery of advertisements to subscriber equipment based on information descriptive of the subscriber;
selecting advertisements from an advertising server, based on detected selections of advertisements or a detected channel distribution service preference;
transmitting a globally unique identifier of the set top box to a billing server;
initiating storage of the selectable advertisements at a remote advertisement delivery server; and
presenting the selectable advertisements to the set top box.

2. The server of claim 1, wherein the information comprises demographic information, a geographic location, a purchased product, or a purchased service.

3. The server of claim 1, further comprising a unicast stream server, and wherein the selectable advertisements are presented to the set top box in a unicast transmission.

4. The server of claim 3, wherein a selectable advertisement presented in the unicast transmission is incorporated into a digital video stream before being presented to the set top box.

5. The server of claim 1, wherein the operations further comprise storing the selectable advertisements at the advertisement delivery server using the globally unique identifier of the set top box.

6. The server of claim 1, wherein the operations further comprise initiating storage of the selectable advertisements at the set top box.

7. The server of claim 1, wherein the operations further comprise collecting electronic programming guide information or channel subscription information from an internet protocol television network.

8. The server of claim 1, wherein the server, the set top box, the advertising server, the billing server, and the advertisement delivery server operate in an internet protocol television network.

9. A server comprising:
a memory to store executable instructions; and
a controller coupled to the memory, wherein responsive to executing the instructions, the controller performs operations comprising:
logging selections of advertisement preferences from an advertising server or channel service preferences from a channel service server, wherein the selections are received from subscriber equipment at an internet protocol television network;
storing billing information regarding the subscriber;
forwarding information regarding the selections to a subscriber management system of the internet protocol television network; and
receiving a globally unique identifier of a set top box.

10. The server of claim 9, wherein the operations further comprise logging a channel selection of the subscriber equipment.

11. The server of claim 9, wherein the operations further comprise logging an advertisement content selection of the subscriber equipment.

12. The server of claim 11, wherein the operations further comprise forwarding a channel selection of the subscriber equipment and the advertising content selection to the subscriber management system.

13. The server of claim 9, wherein the selections by the subscriber equipment are made using a graphical user interface presented on a display device coupled to the subscriber equipment.

14. The server of claim 9, wherein the set top box comprises the subscriber equipment.

15. A method comprising:
receiving, at a server comprising a processor, a selection by subscriber equipment of advertising content from an advertising server or video channel content from a channel service server, wherein the selection is enabled using a graphical user interface presented via a set top box having a globally unique identifier;

storing, by the server, the selection on a delivery server using the globally unique identifier of the set top box; and inserting, by the server, the selected advertising content into a video stream for presentation by the subscriber equipment, the video stream comprising broadcasted content, wherein the selected advertising content is incorporated into the video stream in response to a signal in the broadcasted content that an advertisement is to be inserted.

16. The method of claim 15, wherein the signal comprises a queue tone.

17. The method of claim 15, further comprising inserting, by the server, advertising content in accordance with a default advertising insertion policy when no selection by the subscriber equipment of advertising content is received.

18. The method of claim 15, further comprising forwarding, by the server, information comprising the selection to a subscriber management system of an internet protocol television network.

19. The method of claim 15, wherein the selected advertising content and the video channel content are stored on separate servers.

20. The method of claim 15, wherein the selected advertising content is delivered to the set top box via a unicast transmission.

* * * * *